(12) United States Patent
Nakamura et al.

(10) Patent No.: US 8,539,052 B2
(45) Date of Patent: Sep. 17, 2013

(54) CONTROL ASSISTANCE SYSTEM, INFORMATION PROCESSING APPARATUS AND COMPUTER-READABLE MEDIUM HAVING A COMPUTER PROGRAM

(75) Inventors: Yousuke Nakamura, Kawasaki (JP); Kazuaki Nimura, Kawasaki (JP); Kouichi Yasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 345 days.

(21) Appl. No.: 12/620,744

(22) Filed: Nov. 18, 2009

(65) Prior Publication Data

US 2010/0161772 A1 Jun. 24, 2010

(30) Foreign Application Priority Data

Dec. 19, 2008 (JP) ................................. 2008-324513

(51) Int. Cl.
*G06F 15/177* (2006.01)
(52) U.S. Cl.
USPC .......................................... 709/221; 709/224
(58) Field of Classification Search
USPC ................. 709/221, 220, 222, 223–225, 229; 713/100, 168, 176; 455/410, 411, 557, 558
See application file for complete search history.

(56) References Cited

U.S. PATENT DOCUMENTS

| | | | | |
|---|---|---|---|---|
| 5,898,783 A * | 4/1999 | Rohrbach | ..................... | 340/5.31 |
| 6,085,244 A | 7/2000 | Wookey | | |
| 6,643,781 B1 * | 11/2003 | Merriam | ......................... | 726/35 |
| 7,130,701 B1 * | 10/2006 | Wischinski | ..................... | 700/65 |
| 7,191,227 B2 | 3/2007 | Lachaud et al. | | |
| 7,367,063 B1 | 4/2008 | O'Toole, Jr. | | |
| 7,516,250 B2 * | 4/2009 | Pierce et al. | ..................... | 710/16 |
| 2001/0052005 A1 | 12/2001 | Lachaud et al. | | |
| 2005/0198513 A1 * | 9/2005 | Rodriguez et al. | ............. | 713/182 |
| 2005/0209969 A1 * | 9/2005 | Kanazawa et al. | .............. | 705/51 |
| 2006/0107058 A1 * | 5/2006 | Lewis et al. | ................... | 713/176 |
| 2006/0154645 A1 * | 7/2006 | Valkenburg | ................... | 455/411 |
| 2007/0022094 A1 * | 1/2007 | Hicks et al. | ........................ | 707/3 |
| 2007/0138999 A1 * | 6/2007 | Lee et al. | ....................... | 320/107 |

FOREIGN PATENT DOCUMENTS

| | | |
|---|---|---|
| EP | 0899647 | 3/1999 |
| EP | 1 115 062 | 7/2001 |
| JP | 2001-243202 | 9/2001 |
| JP | 2003-169075 | 6/2003 |
| JP | 2008-176647 | 7/2008 |
| WO | 2006/089352 | 8/2006 |

OTHER PUBLICATIONS

Extended European Search Report dated Apr. 27, 2012 issued in corresponding European Patent Application No. 09178352.2.
Japanese Office Action issued Jun. 4, 2013 in corresponding Japanese Patent Application No. 2008-324513.

* cited by examiner

*Primary Examiner* — Ruolei Zong
(74) *Attorney, Agent, or Firm* — Staas & Halsey LLP

(57) ABSTRACT

A control assistance system and method include transmitting identification information and part identification information of a managed apparatus, storing identification information of the managed apparatus and the part identification information in a correspondence manner, specifying a combination of parts of the managed apparatus based on a correspondence between the identification information received from the managed apparatus and the identification information stored in the database, writing the received identification information in the database according to the specified combination of parts of the managed apparatus and transmitting a signal of restricting an operation to the specified managed apparatus.

12 Claims, 11 Drawing Sheets

FIG. 6

| NO. | PSID | PCID | DETERMINATION | PROCESSING CONTENTS |
|---|---|---|---|---|
| 1 | A | A | COMMUNICATION MODULE AND MB NOT CHANGED | NOT UPDATED |
| 2 | A | B | MB MAINTENANCE AND EXCHANGE | PCID UPDATED |
| 3 | A | C | INVALID EXCHANGE OF COMMUNICATION MODULE | OPERATIONAL RESTRICTION |
| 4 | B | A | COMMUNICATION MODULE MAINTENANCE AND EXCHANGE | PSID UPDATED |
| 5 | B | B | NEW EXCHANGE OR EXCHANGE FOR MAINTENANCE | NEW REGISTRATION |
| 6 | B | C | NONE | |

A: MATCHED  B: UNMATCHED AND UNREGISTERED IN DATABASE  C: UNMATCHED AND REGISTERED IN DATABASE

FIG. 7

| NO. | PSID | HDDID | DETERMINATION | PROCESSING CONTENTS |
|---|---|---|---|---|
| 1 | A | A | COMMUNICATION MODULE AND HDD NOT CHANGED | NOT UPDATE |
| 2 | A | B | HDD MAINTENANCE AND EXCHANGE | HDDID UPDATED |
| 3 | A | C | INVALID EXCHANGE OF COMMUNICATION MODULE | OPERATIONAL RESTRICTION |
| 4 | B | A | COMMUNICATION MODULE MAINTENANCE AND EXCHANGE | PSID UPDATED |
| 5 | B | B | NEW EXCHANGE OR EXCHANGE FOR MAINTENANCE | NEW REGISTRATION |
| 6 | B | C | NONE | |

A: MATCHED    B: UNMATCHED AND UNREGISTERED IN DATABASE    C: UNMATCHED AND REGISTERED IN DATABASE

FIG. 8

| NO. | PSID | PCID | HDDID | DETERMINATION | PROCESSING CONTENTS |
|---|---|---|---|---|---|
| 1 | A | A | A | DB UPDATED BY OPERATOR | NOTHING DONE |
| 2 | A | A | B | HDD EXCHANGED | HDDID UPDATED |
| 3 | A | A | C | INVALID EXCHANGE OF HDD | OPERATIONAL RESTRICTION |
| 4 | A | B | A | MB MAINTENANCE AND EXCHANGE | PCID UPDATED |
| 5 | A | B | B | MB AND HDD MAINTENANCE AND EXCHANGE | PCID AND HDDID UPDATED |
| 6 | A | B | C | MB MAINTENANCE AND EXCHANGE, INVALID EXCHANGE OF HDD | OPERATIONAL RESTRICTION AFTER PCID UPDATED |
| 7 | A | C | A | INVALID EXCHANGE OF COMMUNICATION MODULE | OPERATIONAL RESTRICTION |
| 8 | A | C | B | | |
| 9 | A | C | C | | |
| 10 | B | A | A | COMMUNICATION MODULE MAINTENANCE AND EXCHANGE | PSID UPDATED |
| 11 | B | A | B | COMMUNICATION MODULE AND HDD MAINTENANCE AND EXCHANGE | PSID AND HDDID UPDATED |
| 12 | B | A | C | COMMUNICATION MODULE MAINTENANCE AND EXCHANGE, INVALID EXCHANGE OF HDD | OPERATIONAL RESTRICTION AFTER PSID UPDATED |
| 13 | B | B | A | COMMUNICATION MODULE AND MB MAINTENANCE AND EXCHANGE | PSID AND HDDID UPDATED |
| 14 | B | B | B | USE OR EXCHANGE FOR MAINTENANCE OF UNREGISTERED COMPUTER | NEW REGISTRATION |
| 15 | B | B | C | NONE | |
| 16 | B | C | A | | |
| 17 | B | C | B | | |
| 18 | B | C | C | | |

A: MATCHED  B: UNMATCHED AND UNREGISTERED IN DATABASE  C: UNMATCHED AND REGISTERED IN DATABASE

CONTROL ASSISTANCE SYSTEM, INFORMATION PROCESSING APPARATUS AND COMPUTER-READABLE MEDIUM HAVING A COMPUTER PROGRAM

CROSS-REFERENCE TO RELATED APPLICATIONS

This application is based upon and claims the benefit of priority of the prior Japanese Patent Application No. 2008-324513, filed on Dec. 19, 2008, the entire contents of which are incorporated herein by reference.

BACKGROUND

1. Field

The embodiment(s) of the present invention relate to a control assistance system, information processing apparatus and computer-readable medium having a program for examining a validity of exchange of part(s) and restricting an operation of a managed apparatus whose part has been invalidly exchanged.

2. Description of the Related Art

There is a problem that if an electronic device such as cell phone or personal computer is stolen, confidential information stored therein may be leaked. Thus, the cell phone having a communication function employs a system in which a victim remotely transmits an instruction signal to prohibit the use of the stolen cell phone or to erase the data, thereby avoiding the leakage of the confidential information.

On the contrary, the above system is not employed for the electronic devices having no communication function other than the cell phone. The electronic devices are communicable via a separate communication module. The electronic devices are communicable via a communication path connected to the communication module. Therefore, for example, when the communication module of the stolen electronic device is exchanged to a different communication module, the communication path is different so that the instruction signal by the victim cannot reach the stolen electronic device.

Further, a storage device provided in an electronic device may be easily exchanged for maintenance. Thus, for example, when the storage device taken out from the stolen electronic device is connected to another electronic device, it is out of control of the stolen electronic device so that the instruction signal by the victim cannot reach the storage device.

There is discussed in Japanese Patent Application Laid-Open Nos. 2003-169075 and 2001-243202 a system for managing information on parts in a server.

SUMMARY

According to an aspect of the invention, a control assistance system includes: a managed apparatus having a plurality of parts, and a managing apparatus for remotely controlling the managed apparatus, where the managed apparatus includes a transmission unit for transmitting identification information and part identification information of the managed apparatus, and the managing apparatus includes a database for storing therein the identification information on the managed apparatus and the part identification information in a correspondence manner, a specification unit for specifying a combination of parts of the managed apparatus based on the correspondence between the identification information received from the managed apparatus and the identification information stored in the database, a write unit for writing the received identification information in the database according to the specified combination of parts of the managed apparatus, and an instruction unit for transmitting a signal of restricting the operation to the specified managed apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed. Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 6 is a diagram for explaining an identification information matching processing performed by a CPU;

FIG. 7 is a diagram for explaining an identification information matching processing performed by a CPU, according to an embodiment;

FIG. 8 is a diagram for explaining an identification information matching processing performed by a CPU;

DETAILED DESCRIPTION OF EMBODIMENTS

Figure 1:
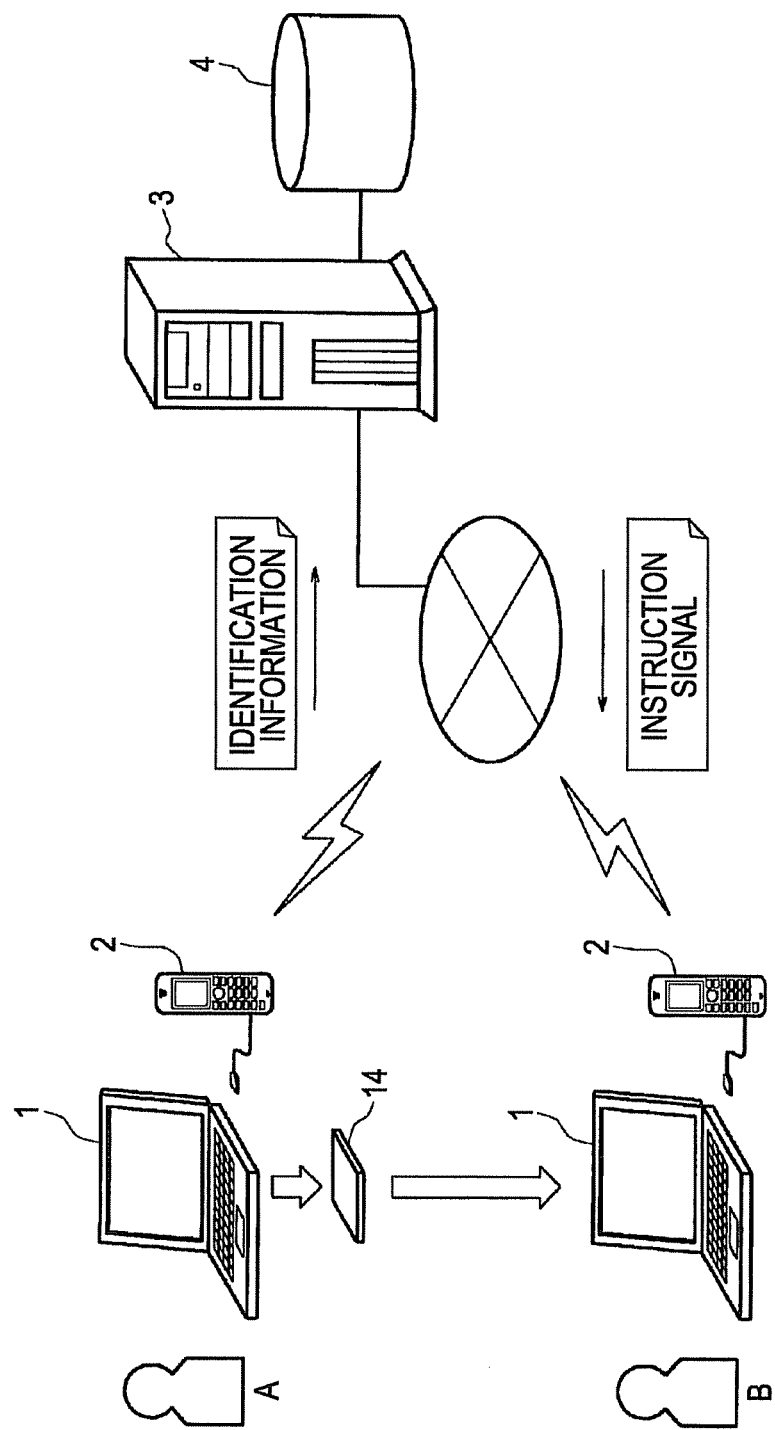
FIG. 1 is a schematic diagram illustrating a control assistance system.

Reference will now be made in detail to the embodiments, examples of which are illustrated in the accompanying drawings, wherein like reference numerals refer to the like elements throughout. The embodiments are described below to explain the present invention by referring to the figures.

A system and method for managing information on parts in a server only reports the information on parts from a managed apparatus to the server. For example, the management information is not automatically updated in response to the exchange of parts. Consequently, if an operator forgets to update the management information, the management information cannot be accurately grasped or obtained, thereby reducing the reliability of the system. Further, the leakage of the confidential information cannot be avoided in response to the exchange of parts.

A control assistance system according to an aspect of the present invention automatically updates the management information on parts to grasp and obtain information of a combination of parts based on the latest management information, and restricts an operation of the managed apparatus depending on the grasped information of the combination of parts.

The control assistance system has a managed apparatus and a managing apparatus. The managed apparatus has a plurality of parts. The managing apparatus remotely controls the managed apparatus. The control assistance system further includes a database. The database stores therein identification information on the managed apparatus and identification information on the parts in a correspondence manner. The managed apparatus includes a transmission unit. The transmission unit transmits the identification information to the managing apparatus. The identification information includes information for identifying the managed apparatus and information for identifying the parts of the managed apparatus. The managing apparatus includes a specification unit, a write unit and an instruction unit. The specification unit specifies a combination of the parts of the managed apparatus based on the correspondence between the identification information received from the managed apparatus and the identification information stored in the database. The write unit writes the received identification information in the database depending on the specified combination of the parts of the managed apparatus. The instruction unit transmits a signal of restricting an operation to the specified managed apparatus.

The control assistance system according to another aspect has an information processing apparatus and an external apparatus. The external apparatus has a plurality of parts. The information processing apparatus controls the external apparatus. The information processing apparatus includes a storage unit, a specification unit, write unit and an instruction unit. The storage unit stores therein identification information on the external apparatus and identification information on the parts in a correspondence manner. The specification unit specifies a combination of the parts of the external apparatus based on the correspondence between the identification information received from the external apparatus and the identification information stored in the storage unit. The write unit writes the received identification information in the storage unit depending on the specified combination of the parts of the external apparatus. The instruction unit transmits a signal of restricting an operation to the specified external apparatus.

A computer-readable medium having a program stored therein according to still another aspect causes a computer to control the external apparatus having a plurality of parts. The computer program causes the computer to perform a storage procedure, a specification procedure, a write procedure and a transmission procedure. The storage procedure causes the computer to store the identification information on the external apparatus and the identification information on the parts in a correspondence manner. The specification procedure causes the computer to specify a combination of the parts of the external apparatus based on the correspondence between the identification information received from the external apparatus and the stored identification information. The write procedure causes the computer to write the received identification information depending on the specified combination of the parts of the external apparatus. The transmission procedure causes the computer to transmit a signal of controlling an operation to the specified external apparatus.

The examples of the control assistance system, the information processing apparatus and the computer program store the identification information on the managed apparatus and the identification information on the parts in a correspondence manner. The examples grasp or obtain information of the combination of the parts of the managed apparatus based on the stored identification information. The examples automatically update the database based on the grasped information of the combination of the parts. Consequently, the examples keep the management information on the parts at the latest state. The examples transmit a signal of restricting an operation to the managed apparatus based on the grasped information of the combination of the parts. As a result, the examples prevent the leakage of the confidential information.

The examples of the control assistance system, the information processing apparatus and the computer program automatically update the information on the parts. Further, the embodiment(s) restrict an operation of the managed apparatus depending on the information of the combination of the parts to avoid the leakage of the confidential information.

Examples of the control assistance system, the information processing apparatus and the computer program embodied in the computer-readable medium will be described below with reference to the drawings. In the following explanation, a portable notebook-type personal computer (referred to as notebook-type personal computer below) is assumed as the managed apparatus. While the personal computer is used as an example, the present invention is not limited to any particular type of device or terminal.

FIG. 1 is a schematic diagram illustrating a control assistance system. The control assistance system has a notebook-type personal computer 1, a communication module 2, a management server 3 and a user information database 4. Further, the notebook-type personal computers (not illustrated) other than the managed apparatus are present outside the control assistance system. The notebook-type personal computer 1 is the managed apparatus. The communication module 2 is a communication unit of the notebook-type personal computer 1. The management server 3 remotely controls the notebook-type personal computer 1. The user information database 4 stores therein the information on the notebook-type personal computer 1. The notebook-type personal computers other than the managed apparatus transmit a remote control signal to the notebook-type personal computer 1.

Multiple notebook-type personal computers 1 are present to be owned and operated by respective users. The notebook-type personal computer 1 has a plurality of parts. The parts are exchangeable for maintenance. For example, a user B takes out an auxiliary storage device 14 described in detail below from the notebook-type personal computer 1 of a user A and exchanges the same for an auxiliary storage device 14 of the notebook-type personal computer of the user B. When starting to supply power to the computer main body or receiving the remote control signal transmitted from other notebook-type personal computer, the notebook-type personal computer 1 detects an exchange of parts. The notebook-type personal computer 1 transmits the detected part identification information to the management server 3.

The management server 3 is operated by an operator. The management server 3 receives the part identification information transmitted from the notebook-type personal computer 1. The management server 3 reads data from the user information database 4 and compares the same with the received part identification information. The management server 3 determines whether the exchange of the part of the notebook-type personal computer 1 is valid. When it is determined that the exchange of the part of the notebook-type personal computer 1 is valid, the management server 3 updates the user information database 4 based on the received part identification information. On the other hand, when it is determined that the exchange of the part of the notebook-type personal computer 1 is invalid, the management server 3 generates an instruction signal of restricting the operation and transmits the same to the notebook-type personal computer 1.

The notebook-type personal computer 1 restricts the operation according to the instruction signal received from the management server 3. The restriction of the operation is to prohibit the startup of the operation system (referred to as OS below) or to prohibit the erasure of data stored in the auxiliary storage device 14.

Figure 2:
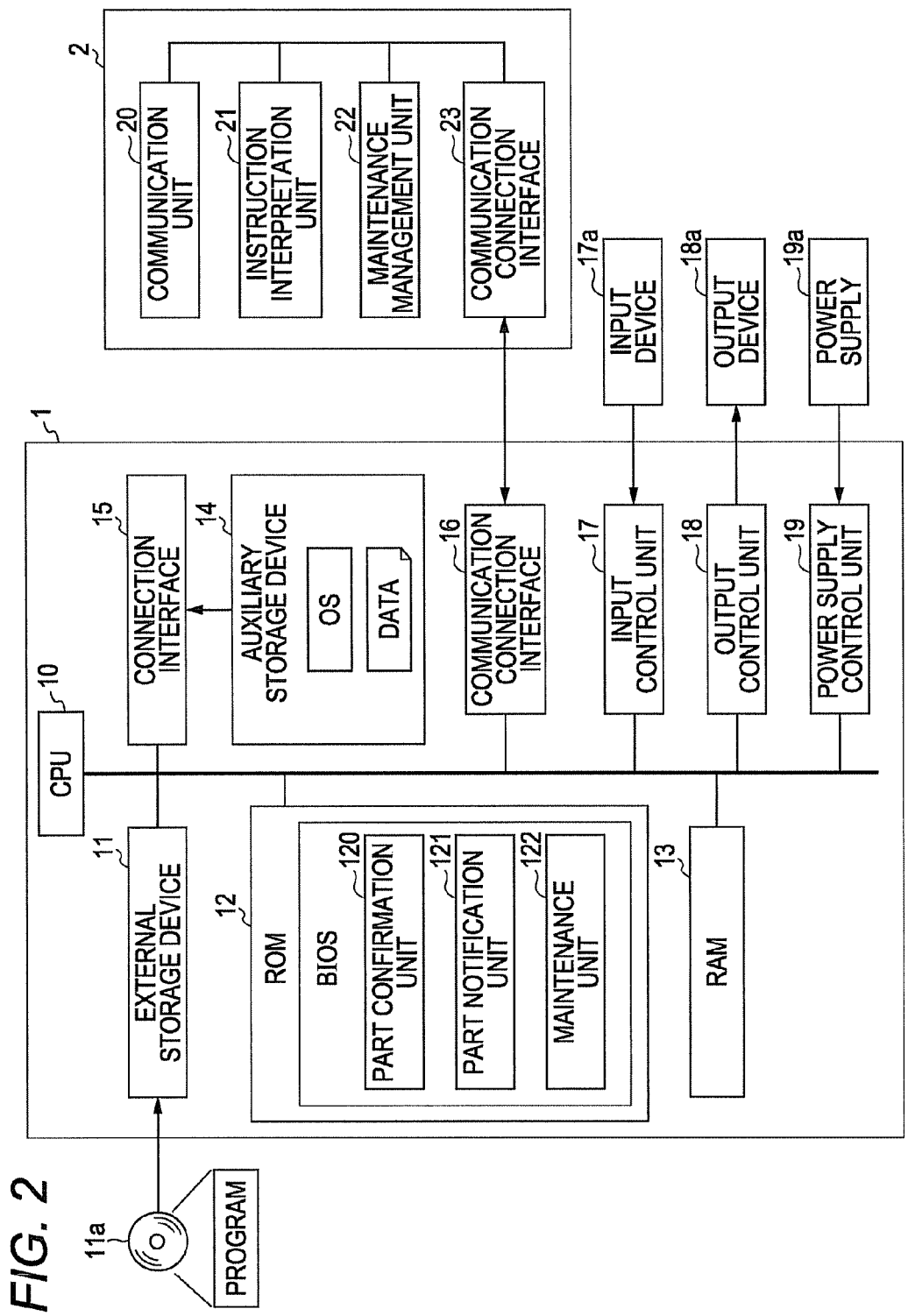
FIG. 2 is a block diagram illustrating a notebook-type personal computer and a communication module.

FIG. 2 is a block diagram illustrating the notebook-type personal computer 1 and the communication module 2. The notebook-type personal computer 1 includes the following parts. The notebook-type personal computer 1 includes an external storage device 11, a ROM 12, a RAM 13, an auxiliary storage device 14, a connection interface 15, a communication connection interface 16, an input control unit 17, an output control unit 18, a power supply control unit 19 and a CPU 10. The respective parts are interconnected via a bus. The auxiliary storage device 14 is exchangeable for maintenance.

The external storage device 11 reads the data (including programs) recorded in a recording medium 11a. The external storage device 11 outputs the read data or the like to the auxiliary storage device 14. The programs include the OS and other application software.

The ROM 12 is a storage device from which recorded data may be read. The ROM 12 is a semiconductor device for storing Basic Input/Output System (referred to as BIOS below) and other firmware. The ROM 12 is not read-only but is capable of rewriting the stored BIOS.

The BIOS is one firmware and is a system for performing input/output on each part at the lowest level. When a power supply 19a described in detail below starts to supply power, the BIOS is read from the ROM 12 to the RAM 13 and is executed by the CPU 10. The BIOS initializes each part and executes the startup of the OS. The BIOS functions as a part confirmation unit 120, a part notification unit 121 and a maintenance unit 122.

The part confirmation unit 120 is an exchange detection unit for detecting an exchange of parts. The part conformation unit 120 holds the part identification information described in detail below. The part confirmation unit 120 newly detects the part identification information and compares the same with the held identification information. The part confirmation unit 120 determines whether a part has been exchanged. When it is determined that a part has been exchanged, the part confirmation unit 120 outputs the detected part identification information to the part notification unit 121. The identification information held by the part conformation unit 120 is not the identification information detected by the part confirmation unit 120 but the update information transmitted from the management server 3. The update information is the latest data in the user information database 4 updated by the management server 3 as described below. The part identification information includes, for example, PSID, PCID and HDDID.

The PSID is a unique identification number of the communication module 2. The PSID is stored in a vendor extension of USB descriptor of the communication connection interface 16 when the communication module 2 is USB-connected to the communication connection interface 16. The part confirmation unit 120 refers to data stored in a vendor extension to detect the PSID.

The PCID is a unique identification number of the notebook-type personal computer 1 main body, that is for example, a main electronic circuit substrate (referred to as mother board below) for mounting thereon the parts. The PCID is written and stored in the ROM 12 at the time of shipment. The part confirmation unit 120 refers to the data stored in the ROM 12 to detect the PCID.

The HDDID is a unique identification number of the auxiliary storage device 14. The HDDID is written and stored in the auxiliary storage device 14 at the time of shipment. The part confirmation unit 120 uses an identify device command of ATA command to read the data stored in the auxiliary storage device 14 and to detect the HDDID.

The part notification unit 121 receives the part identification information output from the part confirmation unit 120. The part notification unit 121 converts the received part identification information into a notification form and outputs the same to the communication module 2. The notification form is a text message usable in Short Message Service (SMS).

The maintenance unit 122 receives an instruction signal transmitted from the management server 3 via the communication module 2. The maintenance unit 122 controls the parts according to the received instruction signal. Further, the maintenance unit 122 receives a remote control signal transmitted from other notebook-type personal computer. The maintenance unit 122 controls the parts according to the received remote control signal.

One example of the operation of the BIOS will be described. The part confirmation unit 120 tries to detect the part identification information when the power supply 19a starts to supply power or in response to the reception of the remote control signal transmitted from other notebook-type personal computer. The remote control signal is an instruction signal of erasing the data in the auxiliary storage device 14, for example.

When being capable of detecting the identification information on the parts including the communication module 2, the part confirmation unit 120 compares this identification information with the held identification information. When determining that all the items of part identification information are matched, the part confirmation unit 120 outputs a notification indicating that a part has not been exchanged to the maintenance unit 122. The maintenance unit 122 performs typical processing(s) according to the received notification without requiring the communication with the management server 3. The information identifying part or all or the parts is not limited to a number, instead, the information may be any data that uniquely identifies all or the parts with respect to an apparatus.

On the other hand, when determining that all or part of the items of part identification information are different, the part confirmation unit 120 determines that a part has been exchanged, and outputs the detected part identification information to the part notification unit 121. The part notification unit 121 converts the received part identification information into a notification form and outputs the same to the communication module 2.

In this manner, the notebook-type personal computer 1 does not communicate with the management server 3 when it is determined that a part has not been exchanged. As a result, it is possible to eliminate the time to establish a communication with the management server 3 or a communication cost for the management server 3, thereby reducing the startup time of the OS and eliminating unwanted cost.

On the other hand, when the identification information on the communication module 2 cannot be detected, the part confirmation unit 120 determines that the communication module 2 is out of order or the communication module 2 is not connected thereto. The part confirmation unit 120 outputs the notification indicating the fact to the part notification unit 121. The part notification unit 121 uses a communication path (not illustrated) other than the communication module 2 to determine whether to be connectable with the management server 3. The communication path other than the communication module 2 is LAN, dial-up, Bluetooth and the like. When the part notification unit 121 determines to be connectable to the management server 3 by using the communication path other than the communication module 2, the part notification unit 121 uses the communication path to transmit the part identification information to the management server 3.

On the other hand, when the part notification unit 121 determines to be unconnectable to the management server 3, the part notification unit 121 outputs the notification indicating the fact to the maintenance unit 122. The maintenance unit 122 determines that the notebook-type personal computer 1 may be illegally used by other person, and performs a self defense processing. The self defense processing is to control the auxiliary storage device 14 to prohibit the startup of the OS. In this manner, when being unable to communicate with the management server 3, the notebook-type personal computer 1 may perform the self defense countermeasure based on its determination.

The RAM 13 temporarily stores therein the data generated by the execution of the CPU 10 or the data read from the auxiliary storage device 14. The RAM 13 is a semiconductor such as SDRAM (Synchronous DRAM) or SRAM (Static RAM).

The auxiliary storage device 14 stores therein the data received from the external storage device 11, the input control unit 17 or the communication module 2, the OS and the like. The data stored in the auxiliary storage device 14 includes confidential information, which causes disadvantages due to its leakage to the third party, such as user's personal information, customer information or internal information. The auxiliary storage device 14 corresponds to a hard disc drive (HDD) of magnetic disk recording system or a flash solid state drive (Flash SSD) made of NAND device. The auxiliary storage device 14 is detachable via the connection interface 15.

The connection interface 15 conforms to the ATA (Advanced Technology Attachment) standard.

The communication connection interface 16 is an interface for connecting to the communication module 2. The communication connection interface 16 according to an embodiment conforms to the USB (Universal Serial Bus) standard.

The input control unit 17 controls to output the data received from the input device 17a to the RAM 13 or the auxiliary storage device 14. The input device 17a corresponds to a keyboard and a touch panel, for example.

The output control unit 18 controls to output the data read from the RAM 13 or the auxiliary storage device 14 to the output device 18a. The output device 18a corresponds to a liquid crystal monitor and a speaker, for example.

The power supply control unit 19 controls power supplied from the power supply 19a to each part. The power supply control unit 19 starts to supply power to each part when the power supply 19a is turned "ON". The BIOS is read from the ROM 12 to the RAM 13 at the start of the power supply.

The CPU 10 reads the application software and the data from the auxiliary storage device 14, and performs various processing as calculator according to the read application software and data when the OS is being activated.

The communication module 2 corresponds to a cell phone, card-type data communication dedicated terminal and the like, for example. The communication module 2 has at least a communication unit 20, an instruction interpretation unit 21, a maintenance management unit 22 and a communication connection interface 23.

The communication unit 20 controls communication with other notebook-type personal computer or the management server 3. The communication unit 20 receives a remote control signal transmitted from other notebook-type personal computer and outputs the same to the maintenance unit 122 of the notebook-type personal computer 1. Further, the communication unit 20 receives an instruction signal transmitted from the management server 3 and outputs the same to the instruction interpretation unit 21. Furthermore, the communication unit 20 receives update information transmitted from the management server 3 and outputs the same to the part confirmation unit 120 of the notebook-type personal computer 1. The communication unit 20 receives a notification of the part identification information output from the part notification unit 121 and transmits the same to the management server 3.

The instruction interpretation unit 21 interprets the contents of the instruction signal received from the management server 3 and outputs the interpreted instruction contents to the maintenance management unit 22.

The maintenance management unit 22 corrects the instruction contents received from the instruction interpretation unit 21 according to the power supplying state of the notebook-type personal computer 1 and outputs the same to the maintenance unit 122 of the notebook-type personal computer 1. The power supplying state of the notebook-type personal computer 1 changes due to the exchange of a part. The contents to be instructed also change depending on the change in the power supplying state of the notebook-type personal computer 1. Thus, the instruction contents are corrected depending on the power supplying state of the notebook-type personal computer 1.

The communication connection interface 23 is an interface for connecting to the notebook-type personal computer 1, and exchanges data with the notebook-type personal computer 1. The communication connection interface 23 according to an embodiment conforms to the USB standard.

Figure 3:
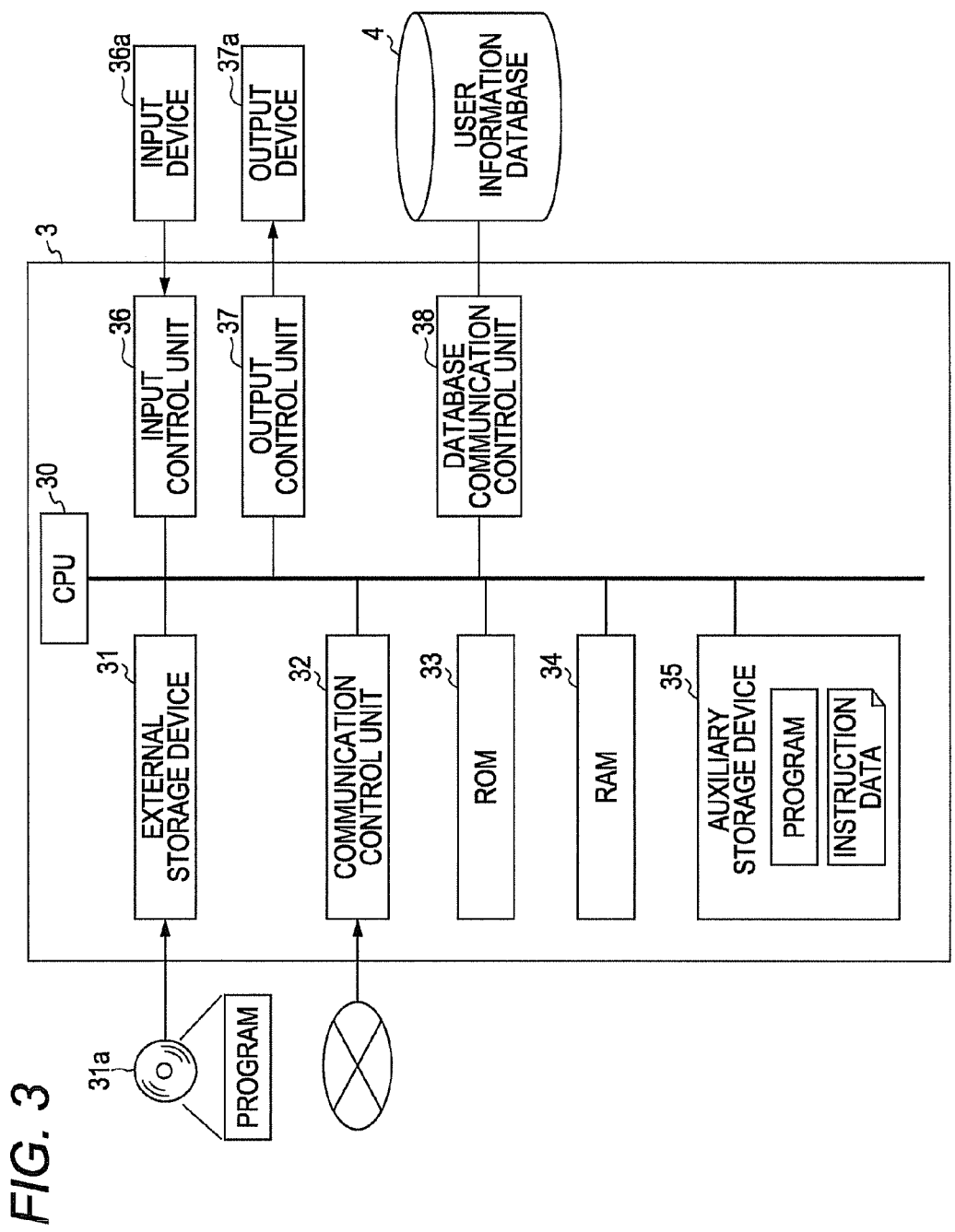
FIG. 3 is a block diagram illustrating a management server.

FIG. 3 is a block diagram illustrating the management server 3 according to an embodiment. The management server 3 has an external storage device 31, a communication control unit 32, a ROM 33, a RAM 34, an auxiliary storage device 35, an input control unit 36, an output control unit 37, a database communication control unit 38 and a CPU 30. The units are interconnected via a bus.

The external storage device 31 reads the data (including programs) recorded in a recording medium 31a. The external storage device 31 outputs the read data and the like to the auxiliary storage device 35. The programs include the OS, the disclosed computer programs and other application software.

The communication control unit 32 controls to communicate with the communication module 2 via the Internet. The communication control unit 32 transmits the instruction signal or the update information to the communication module 2. The communication control unit 32 receives a notification of the part identification information transmitted from the communication module 2 and outputs the same to the auxiliary storage device 35.

The ROM 33 is a storage medium from which the stored data may be read. The ROM 33 is a semiconductor device for storing therein a firmware.

The RAM 34 temporarily stores therein the data generated by the execution of the CPU 30 or the data read from the auxiliary storage device 35. The RAM 34 corresponds to a semiconductor such as SDRAM (Synchronous DRAM) or SRAM (Static RAM).

The auxiliary storage device 35 stores therein the programs, the part identification information, the instruction data and other data received from the external storage device 31, the communication control unit 32, the input control unit 36 and the database communication control unit 38. The instruction data is a source in which an instruction creation unit described in detail below creates an instruction signal. The auxiliary storage device 35 is a hard disc drive (HDD) of magnetic disc recording system or a flash solid state drive (Flash SSD) made of NAND device.

The input control unit 36 controls to output the data received from the input device 36a to the RAM 34 or the auxiliary storage device 35. The input device 36a corresponds to a keyboard and a mouse, for example.

The output control unit 37 controls to output the data read from the RAM 34 or the auxiliary storage device 35 to the output device 37a. The output device 37a is a liquid crystal monitor and a speaker, for example.

The database communication control unit 38 controls to communicate with the user information database 4. The database communication control unit 38 outputs the data read from the user information database 4 to the auxiliary storage device 35. The database communication control unit 38 writes the part identification information read from the auxiliary storage device 35 in the user information database 4.

Figure 4:
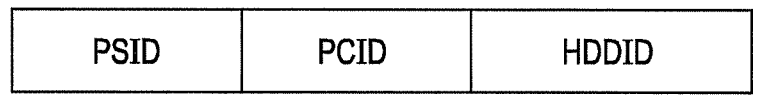
FIG. 4 is a diagram illustrating a format example of data in a user information database.

FIG. 4 is a diagram illustrating a format example of the data in the user information database 4. The user information database 4 stores therein the part identification information of the notebook-type personal computer 1, specifically PSID, PCID and HDDID. The latest part identification information of the notebook-type personal computer 1 is written in the user information database 4 by the management server 3. As a result, the user information database 4 is automatically updated and is maintained at the latest state.

Figure 5:
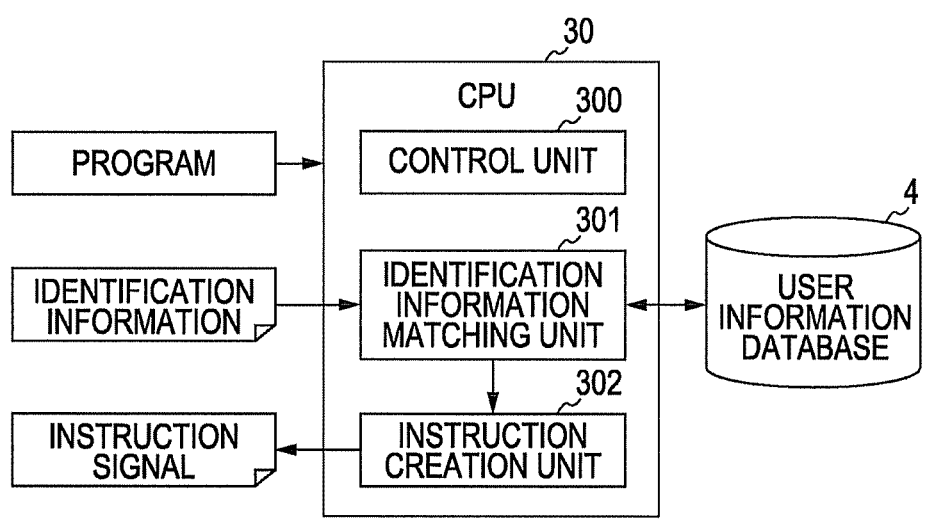
FIG. 5 is a block diagram for explaining function(s) of a CPU.

FIG. 5 is a block diagram for explaining the function of the CPU 30 according to an embodiment. The CPU 30 fulfills a plurality of functions based on the programs, the instruction data, the part identification information and other data stored in the auxiliary storage device 35.

The CPU 30 functions as a control unit 300 for controlling each unit including according to the program stored in the auxiliary storage device 35.

When receiving the part identification information, the CPU 30 functions as an identification information matching unit 301. The CPU 30 reads the data from the user information database 4. The CPU 30 compares the read data with the received part identification information and examines the validity as to whether a part of the notebook-type personal computer 1 has been validly exchanged. The CPU 30 performs writing into the user information database 4 depending on the examination result.

In an embodiment, the valid exchange is not to divert the parts used in other notebook-type personal computer 1. It is assumed that the exchange of parts absolutely uses new parts. On the contrary, the invalid exchange is to divert the parts used in other notebook-type personal computer 1. For example, it is the invalid exchange that the auxiliary storage device 14 taken out from the notebook-type personal computer 1 of the user A is exchanged with the auxiliary storage device 14 of the notebook-type personal computer 1 of the user B. This is because the action leads to the leakage of the confidential information stored in the notebook-type personal computer 1 of the user A. The examination of validity in an embodiment has the following aspects.

FIG. 6 is a diagram for explaining the identification information matching processing performed by the CPU 30 according to an embodiment. The CPU 30 compares the PSID and the PCID received from the communication module 2 with the PSID and the PCID in the user information database 4 and examines the validity of the exchange of the communication module 2 and the motherboard. In FIG. 6, the motherboard is denoted as "MB".

The CPU 30 determines whether the PSID matching with the received PSID is registered in the user information database 4. When it is determined that the matched PSID is registered in the user information database 4, the CPU 30 searches for a record including the PCID matching with the received PCID with the PSIC as an associated key. When it is determined that the record is stored in the user information database 4, the CPU 30 determines that the communication module 2 and the motherboard have not been exchanged. The CPU 30 does not update the data in the user information database 4 (No. 1 in FIG. 6).

On the other hand, when it is determined that the record is not stored in the user information database 4, the CPU 30 further makes the following determinations. When it is determined that the record is not stored because the PCID is unregistered, the CPU 30 determines that the mother board has been validly exchanged for maintenance. The CPU 30 writes a new PCID in the user information database 4 for update (No. 2 in FIG. 6).

Further, when it is determined that the record is not stored because the unmatched PCID is registered, the CPU 30 determines that the communication module 2 of other computer is used, that is, the communication module 2 has been invalidly exchanged. The CPU 30 determines the operational restriction (No. 3 in FIG. 6).

On the other hand, when it is determined that the PSID matching with the received PSID is not registered in the user information database 4, the CPU 30 determines that the communication module 2 has been validly exchanged for maintenance at this time. The CPU 30 further makes the following determinations. When it is determined that the PCID matching with the received PCID is registered in the user information database 4, the CPU 30 determines that the communication module 2 has been validly exchanged for maintenance, and writes a new PSID in the user information database 4 for update (No. 4 in FIG. 6).

When it is determined that the PCID matching with the received PCID is not registered in the user information database 4, the CPU 30 determines that the notebook-type personal computer 1 is to be newly registered or the communication module 2 and the mother board have been validly exchanged for maintenance. The CPU 30 writes new PSID and PCID in the user information database 4 for new registration (No. 5 in FIG. 6).

In an embodiment, the combination of unregistered PSID and unmatched PCID is not present (No. 6 in FIG. 6). An embodiment has been described above.

FIG. 7 is a diagram for explaining the identification information matching processing performed by the CPU 30 according to an embodiment. The CPU 30 compares the PSID and the HDDID received from the management server 3 with the PSID and the HDDID in the user information database 4 and examines the validity of the exchange of the communication module 2 and the auxiliary storage device 14. In FIG. 7, the auxiliary storage device 14 is denoted as "HDD".

The CPU 30 determines whether the PSID matching with the received PSID is registered in the user information database 4. When it is determined that the matched PSID is registered in the user information database 4, the CPU 30 searches for a record including the HDDID matching with the received HDDID with the PSID as an associated key. When it is determined that the record is registered in the user information database 4, the CPU 30 determines that the communication module 2 and the auxiliary storage device 14 have not been exchanged. The CPU 30 does not update the data in the user information database 4 (No. 1 in FIG. 7).

On the other hand, when it is determined that the record is not stored in the user information database 4, the CPU 30 further makes the following determinations. When it is determined that the record is not stored because the HDDID is unregistered, the CPU 30 determines that the auxiliary storage device 14 has been validly exchanged for maintenance. The CPU 30 writes a new HDDID in the user information database 4 for update (No. 2 in FIG. 7).

When it is determined that the record is not stored because the unmatched HDDID is registered, the CPU 30 determines that the communication module 2 has been invalidly exchanged. The CPU 30 determines the operational restriction (No. 3 in FIG. 7).

On the other hand, when it is determined that the PSID matching with the received PSID is not registered in the user information database 4, the CPU 30 determine that the communication module 2 has been validly exchanged for maintenance at this time. The CPU 30 further makes the following determinations. When it is determined that the HDDID matching with the received HDDID is registered in the user information database 4, the CPU 30 determines that the communication module 2 has been validly exchanged for maintenance. The CPU 30 writes a new PSID in the user information database 4 for update (No. 4 in FIG. 7).

When it is determined that the HDDID matching with the received HDDID is not registered in the user information database 4, the CPU 30 determines that the notebook-type personal computer 1 is to be newly registered or the communication module 2 and the auxiliary storage device 14 have been validly exchanged for maintenance. The CPU 30 writes new PSID and HDDID in the user information database 4 for new registration (No. 5 in FIG. 7).

In an embodiment, the combination of unregistered PSID and unmatched and registered HDDID is not present (No. 6 in FIG. 7). An Embodiment has been described above.

FIG. 8 is a diagram for explaining the identification information matching processing performed by the CPU 30 according to an embodiment. The CPU 30 compares the PSID, the PCID and the HDDID received from the management server 3 with the PSID, the PCID and the HDDID in the user information database 4 and examines the validity of the exchange of the communication module 2, the mother board and the auxiliary storage device 14. In FIG. 8, the auxiliary storage device 14 is denoted as "HDD", the mother board is denoted as "MB" and the user information database 4 is denoted as "DB".

The CPU 30 determines whether the PSID matching with the received PSID is registered in the user information database 4. When it is determined that the matched PSID is registered in the user information database 4, the CPU 30 searches for a record including the identification information matching with the received PCID and HDDID with the PSID as an associated key. When it is determined that the record is stored in the user information database 4, the CPU 30 determines that the operator has already updated the user information database 4. The CPU 30 does not update the data in the user information database 4 (No. 1 in FIG. 8).

On the other hand, when it is determined that the record is not stored in the user information database 4, the CPU 30 further makes the following determinations. When it is determined that the record is not stored because the matched PCID is registered but the HDDID is unregistered, the CPU 30 determines that the auxiliary storage device 14 has been validly exchanged for maintenance. The CPU 30 writes a new HDDID in the user information database 4 for update (No. 2 in FIG. 8).

When it is determined that the record is not stored because the matched PCID is registered but the unmatched HDDID is registered, the CPU 30 utilizes the auxiliary storage device 14 of other notebook-type personal computer 1. In other words, the CPU 30 determines that the auxiliary storage device 14 has been invalidly exchanged. The CPU 30 determines the operational restriction (No. 3 in FIG. 8).

When it is determined that the record is not stored because the matched HDDID is registered but the PCID is unregistered, the CPU 30 determines that the mother board has been validly exchanged for maintenance. The CPU 30 writes a new PCID in the user information database 4 for update (No. 4 in FIG. 8).

When it is determined that the record is not stored because the PCID and the HDDID are unregistered, the CPU 30 determines that the mother board and the auxiliary storage device 14 have been validly exchanged for maintenance. The CPU 30 writes new PCID and HDDID in the user information database 4 for update (No. 5 in FIG. 8).

When it is determined that the record is not stored because the PCID is unregistered and the unmatched HDDID is registered, the CPU 30 determines that the mother board has been validly exchanged for maintenance but the auxiliary storage device 14 has been invalidly exchanged. The CPU 30 writes a new PCID in the user information database 4, updates the database 4, and then determines the operational restriction (No. 6 in FIG. 8).

When it is determined that the record is not stored because the unmatched PCID is registered, the CPU 30 determines that the communication module 2 has been invalidly exchanged irrespective of whether the HDDID is matched, unregistered or unmatched. The CPU 30 determines the operational restriction (Nos. 7 to 9 in FIG. 8).

On the other hand, when it is determined that the PSID matching with the received PSID is not registered in the user information database 4, the CPU 30 determine that the communication module 2 has been validly exchanged for maintenance at this time. The CPU 30 further makes the following determinations. When it is determined that the PCID (and HDDID) matching with the received PCID (and HDDID) is registered, the CPU 30 determines that the communication module 2 has been validly exchanged for maintenance. The CPU 30 writes a new PSID in the user information database 4 for update (No. 10 in FIG. 8).

When it is determined that the matched PCID is registered but the HDDID is unregistered, the CPU 30 determines that the communication module 2 and the auxiliary storage device 14 have been validly exchanged for maintenance. The CPU 30 writes new PSID and HDDID in the user information database 4 for update (No. 11 in FIG. 8).

When it is determined that the matched PCID is registered but the unmatched HDDID is registered, the CPU 30 determines that the communication module 2 has been validly exchanged for maintenance but the auxiliary storage device 14 has been invalidly exchanged. The CPU 30 writes a new PSID in the user information database 4, updates the database 4 and then determines the operational restriction (No. 12 in FIG. 8).

When it is determined that the matched HDDID is registered but the PCID is unregistered, the CPU 30 determines that the communication module 2 and the mother board have been validly exchanged for maintenance. The CPU 30 writes new PSID and HDDID in the user information database 4 for update (No. 13 in FIG. 8).

When it is determined that the PCID and the HDDID are unregistered, the CPU 30 determines that the unregistered computer is used or all the parts have been validly exchanged for maintenance. The CPU 30 writes and newly registers new PSID, PCID and HDDID in the user information database 4 for new registration (No. 14 in FIG. 8).

In an embodiment, the combination of the unregistered PSID and PCID and the unmatched and registered HDDID and the combination of the unregistered PSID and the unmatched and registered PCID are not present (Nos. 15 to 18 in FIG. 8). An embodiment has been described above.

As described above, the examination result has the first to fourth combinations. The first combination causes the CPU 30 to update or newly register the part identity. The second combination causes the CPU 30 to determine the operational restriction. The third combination causes the CPU 30 to determine the operational restriction when an instruction signal of erasing the data in the auxiliary storage device 14 has been received. The fourth combination causes the CPU 30 to do nothing.

The CPU 30 functions as an instruction creation unit 302 (see FIG. 5). When determining the operational restriction as the identification information matching unit 301, the CPU 30 reads the instruction data stored in the auxiliary storage device 35. The CPU 30 creates an instruction signal of restricting the operation based on the read instruction data. The CPU 30 transmits the created instruction signal via the communication control unit 32 to the communication module 2. In an embodiment, the instruction signal is an instruction signal of disabling the startup of the OS or an instruction signal of disabling the data erasure.

Figure 9:
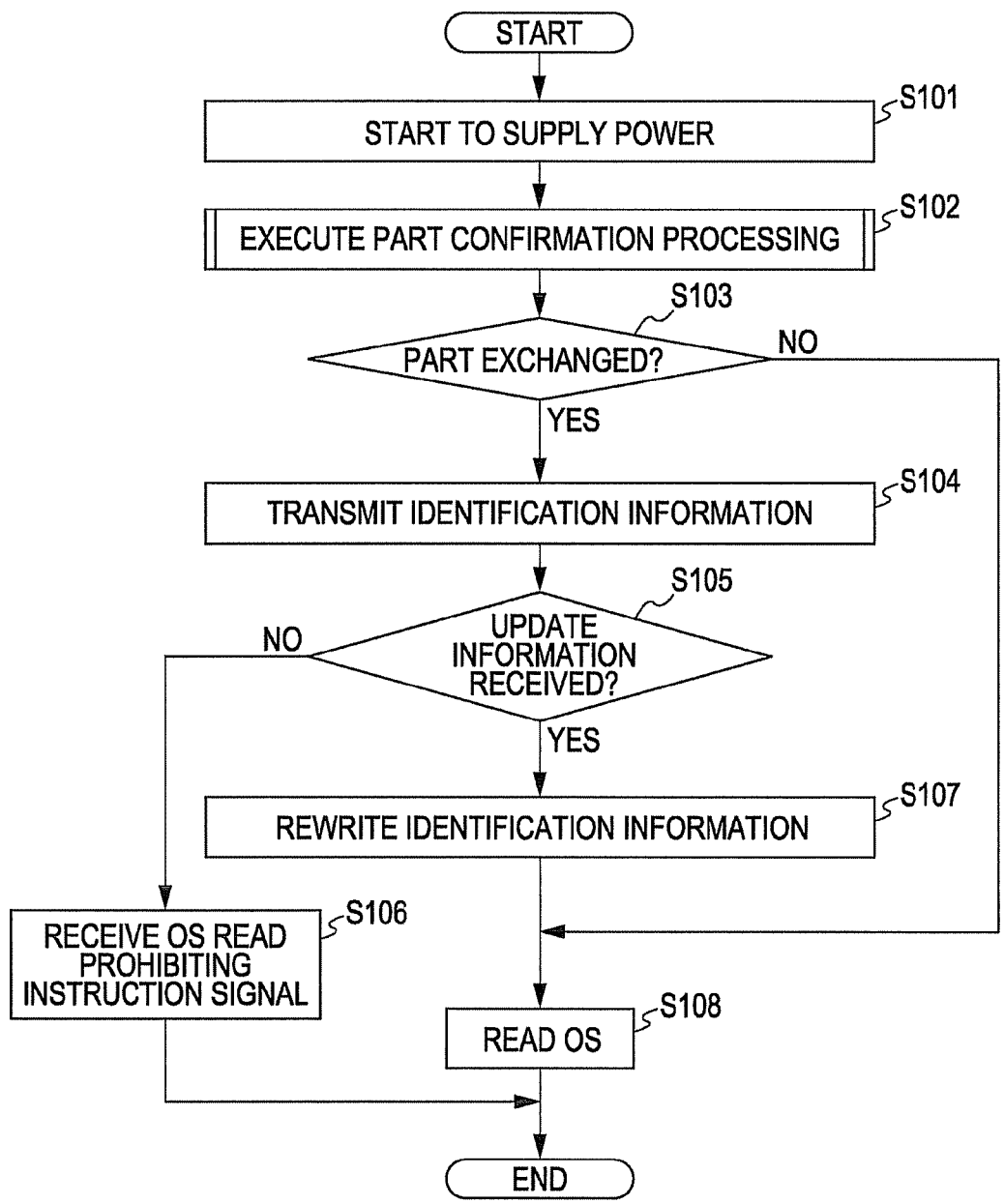
FIG. 9 is a flowchart illustrating a procedure of a processing performed in a notebook-type personal computer.

The CPU 30 of the management server 3 fulfills the aforementioned functions and performs the following processings. The notebook-type personal computer 1 is remotely controlled as follows. FIG. 9 is a flowchart illustrating a procedure of the processing performed by the notebook-type personal computer 1 according to an embodiment. When the power supply button (not illustrated) of the notebook-type personal computer 1 is turned "ON", the power supply 19a starts to supply power (S101) and the BIOS is read from the ROM 12.

The BIOS performs a part confirmation processing (S102). A procedure of the part confirmation processing will be described below. The BIOS determines whether a part has been changed (S103). When it is determined that a part has not been changed (NO in S103), the BIOS reads the OS from the auxiliary storage device 14 (S108) and starts up the OS. The BIOS terminates the processing without communicating with the management server 3, and hands over the subsequent processings to the CPU 10. In other words, the BIOS terminates the processing and returns the processing execution right to the CPU 10.

On the other hand, when it is determined that a part has been changed (YES in S103), the BIOS transmits the part identification information to the management server 3 (S104). The management server 3 examines the validity of the exchange based on the part identification information. When it is determined that the exchange is valid, the management server 3 updates the user information database 4. The management server 3 transmits the update information to the notebook-type personal computer 1. On the other hand, when it is determined that the exchange is invalid, the management sever 3 transmits an OS read prohibiting instruction signal to the notebook-type personal computer 1. The procedure of the processing performed by the management server 3 is described in detail below.

The BIOS determines whether the update information has been received from the management server 3 (S105), and when it is determined that the update information has not been received (NO in S105), receives the OS read prohibiting instruction signal transmitted from the management server 3 (S106). The BIOS stops the power supplying of the power supply 19a to terminate the processing according to the received instruction signal without reading the OS from the auxiliary storage device 14.

On the other hand, when it is determined that the update information has been received (YES in S105), the BIOS rewrites the held identification information to the update information (S107). The BIOS uses the rewritten identification information to perform the next part confirmation processing (see S102). The BIOS reads out the OS from the auxiliary storage device 14 (S108) and starts up the OS. The BIOS terminates the processing and hands over the subsequent processings to the CPU 10.

Figure 10:
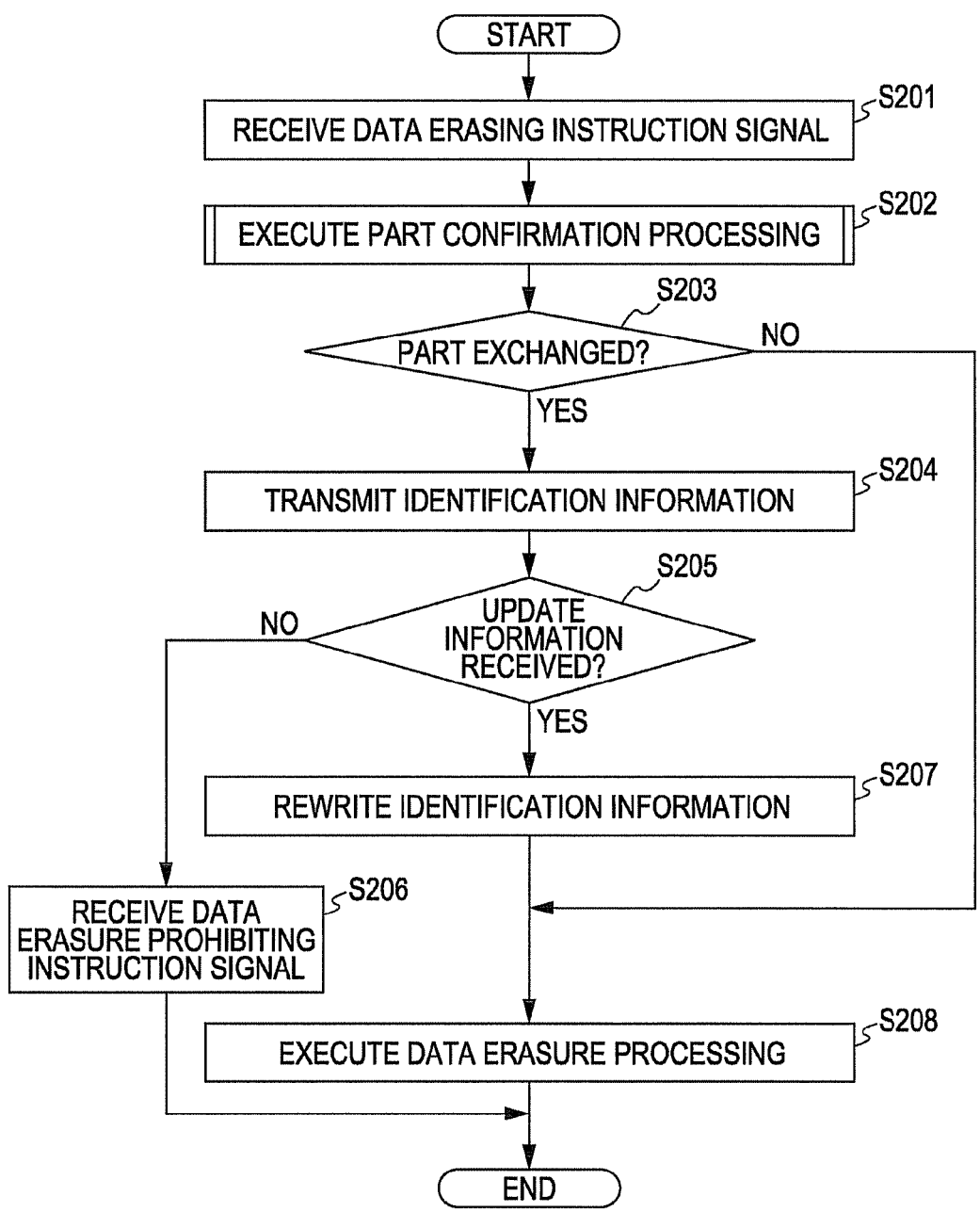
FIG. 10 is a flowchart illustrating a procedure of a processing performed in a notebook-type personal computer.

FIG. 10 is a flowchart illustrating a procedure of the processing performed by the notebook-type personal computer 1 according to an embodiment. The notebook-type personal computer 1 receives a data erasing instruction signal (S201). The CPU 10 hands over the processing to the BIOS of the ROM 12. In other words, the CPU 10 assigns its processing execution right to the BIOS.

The BIOS performs the part confirmation processing (S202). A procedure of the part confirmation processing is described in detail below. The BIOS determines whether a part has been exchanged (S203). When it is determined that a part has not been exchanged (NO in S203), the BIOS performs the processing of erasing the data in the auxiliary storage device 14 (S208). The BIOS terminates the processing and returns the subsequent processings to the CPU 10 without the communication with the management server 3. In other words, the BIOS terminates the processing and returns the processing execution right to the CPU 10.

On the other hand, when it is determined that a part has been exchanged (YES in S203), the BIOS transmits the part identification information to the management server 3 (S204). The management server 3 examines the validity of the exchange based on the part identification information. When it is determined that the exchange is valid, the management server 3 updates the user information database 4. The management server 3 transmits the update information to the notebook-type personal computer 1. On the other hand, when it is determined that the exchange is invalid, the management serve 3 transmits a data erasure prohibiting instruction signal to the notebook-type personal computer 1. The procedure of the processing performed by the management server 3 is described in detail below.

The BIOS determines whether the update information has been received from the management server 3 (S205), and when it is determined that the update information has not been received (NO in S205), receives the data erasure prohibiting instruction signal transmitted from the management server 3 (S206). The BIOS terminates the processing according to the received instruction signal without performing the processing of erasing the data in the auxiliary storage device 14. The BIOS returns the subsequent processings to the CPU 10.

On the other hand, when it is determined that the update information has been received (YES in S205), the BIOS rewrites the held identification information to the update information (S207). The BIOS uses the rewritten identification information to perform the next part confirmation processing (see S202). The BIOS performs the processing of erasing the data in the auxiliary storage device 14 (S208). The BIOS terminates the processing and returns the subsequent processings to the CPU 10.

Figure 11:
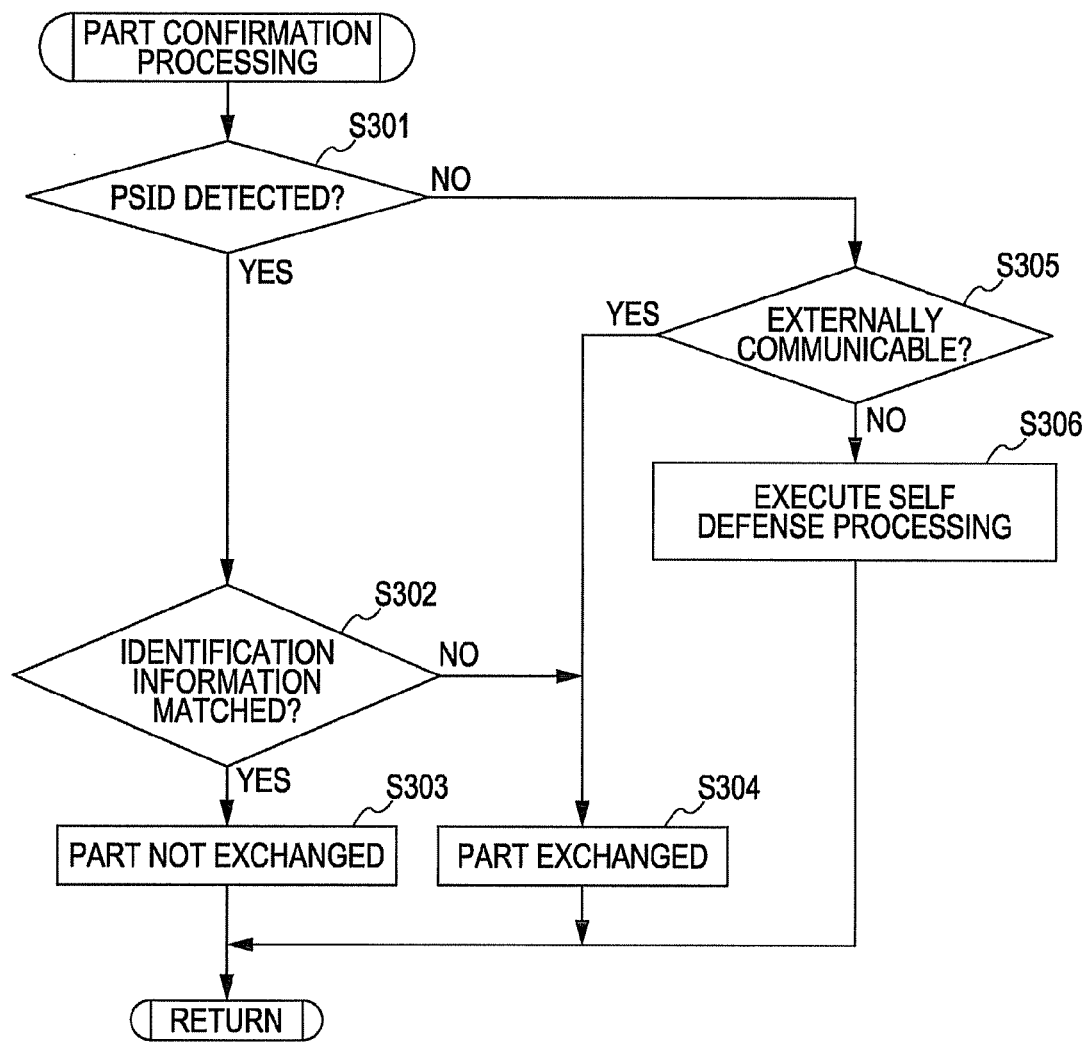
FIG. 11 is a flowchart illustrating a procedure of a part confirmation processing.

The procedure of the part confirmation processing performed in operation S102 or operation S202 will be described below. FIG. 11 is a flowchart illustrating the procedure of the part confirmation processing. The BIOS determines whether the PSID has been detected (S301), and when it is determined that the PSID has been detected (YES in S301), detects the identification information other than the PSID. The BIOS compares the detected identification information with the held identification information and determines whether all the items of part identification information are matched (S302). When it is determined that all the items of part identification information are matched (YES in S302), the BIOS determines that a part has not been exchanged (S303), and returns to the main routine.

On the other hand, when it is determined that all or part of the items of part identification information are different (NO in S302), the BIOS determines that a part has been exchanged (S304), and returns to the main routine.

On the other hand, when it is determined in operation S301 that the PSID cannot be detected (NO in S301), the BIOS determine that the communication module 2 has been validly exchanged at this time. When the BIOS determines whether to be externally communicable (S305) and determines to be unable to externally communicate (NO in S305), the BIOS performs the self defense processing (S306) and returns to the main routine. The BIOS terminates the processing of the main routine and returns the processing execution right to the CPU 30.

On the other hand, when the BIOS determines to be externally communicable (YES in S305), the BIOS determines that a part has been exchanged (S304), and returns to the main routine.

Figure 12:
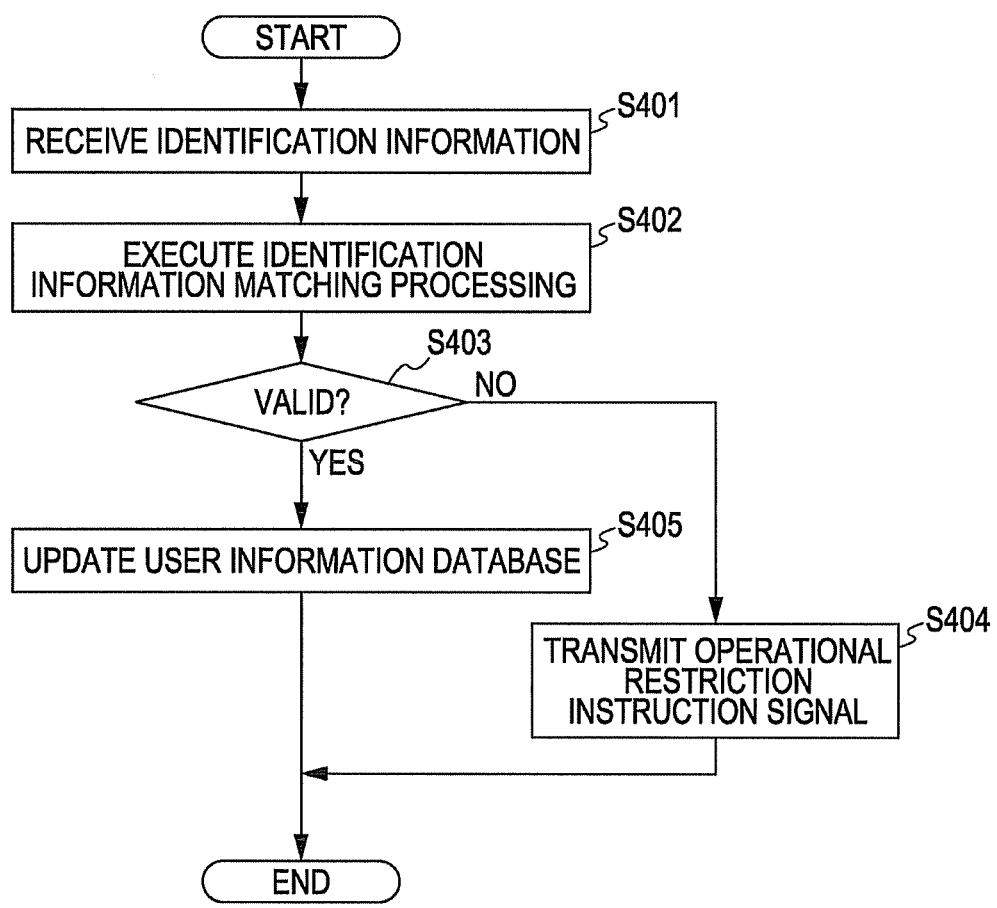
FIG. 12 is a flowchart illustrating a procedure of a control assistance processing performed by a CPU.

FIG. 12 is a flowchart illustrating a procedure of a control assistance processing performed by the CPU 30 according to an embodiment. The CPU 30 of the management server 3 receives the part identification information transmitted from the communication module 2 (S401). The CPU 30 reads the data from the user information database 4 to compare the read data with the received identification information, and performs the identification information matching processing (S402). The CPU 30 determines the validity of the exchange of parts of the notebook-type personal computer 1 in the identification information matching processing.

The CPU 30 determines whether the exchange is valid (S403), and when it is determined that the exchange is invalid (NO in S403), transmits the instruction signal of restricting the operation to the communication module 2 (S404). The CPU 30 terminates the processing.

On the other hand, when it is determined that the exchange is valid (YES in S403), the CPU 30 updates the data in the user information database 4 (S405) and terminates the processing.

There has been described one example in which the notebook-type personal computer is assumed as the managed apparatus according to the aforementioned embodiment. However, the disclosed control assistance system, information processing apparatus and computer program are not limited thereto, and a Personal Digital Assistant (PAD) or other calculator having no communication function may be assumed as the managed apparatus, for example.

There has been described one example in which the part identification information is assumed as the PSID, the PCID and the HDDID in the aforementioned embodiment. However, the disclosed control assistance system, information processing apparatus and computer program are not limited thereto and other IDs may be employed.

There has been described one example in which a HDDID read command is assumed as an identify device command of ATA command in the aforementioned embodiment. However, the disclosed control assistance system, information processing apparatus and computer program are not limited thereto and other read command may be employed.

There has been described one example in which the part identification information is converted into a text message usable in SMS in the aforementioned embodiment. However, the disclosed control assistance system, information processing apparatus and computer program are not limited thereto and a text message usable in other services may be employed.

There has been described one example in which the self defense processing performed by the notebook-type personal computer 1 prohibits the startup of the OS in the aforementioned embodiment. However, the disclosed control assistance system, information processing apparatus and computer program are not limited thereto, and the auxiliary storage device 14 may be controlled for data erasure or the auxiliary storage device 14 may be controlled for erasing an encryption key, for example.

There has been described one example in which the connection interface 15 is assumed as ATA standard in the aforementioned embodiment. However, the disclosed control assistance system, information processing apparatus and computer program are not limited thereto, and SATA (Serial Advanced Technology Attachment), SCSI (Small Computer System Interface), SAS (Serial Attached SCSI) and the like may be employed.

There has been described one example in which the operational restriction disables the startup of the OS or disables the data erasure in the aforementioned embodiment. However, the disclosed control assistance system, information processing apparatus and computer program are not limited thereto as long as they avoid the leakage and/or unauthorized use of the confidential information.

There has been described one example in which the part confirmation is performed when the data erasing instruction signal is received from other notebook-type personal computer in the aforementioned embodiment. However, the disclosed control assistance system, information processing apparatus and computer program are not limited thereto and the part confirmation may be performed when the data erasing instruction signal input via the input device 15a of the notebook-type personal computer 1 is received.

There has been described one example in which the management server 3 examines the validity of the exchange of parts in the notebook-type personal computer 1 when receiving the part identification information transmitted from the notebook-type personal computer 1 in the aforementioned embodiment. However, the disclosed control assistance system, information processing apparatus and computer program embodied in a computer-readable storage medium are not limited thereto, and the management server 3 may receive the part identification information from the notebook-type personal computer 1 when receiving a remote control request for the notebook-type personal computer 1 transmitted from other notebook-type personal computer, and may examine the validity of the exchange of parts in the notebook-type personal computer 1 based on the received part identification information.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc—Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present inventions has been described in detail, it should be understood that the various changes, substitutions, and alterations could be made hereto without departing from the spirit and scope of the invention, the scope of which is defined in the claims and their equivalents.

What is claimed is:

1. A control assistance system comprising:
a processor coupled to a memory;
a managed apparatus having a plurality of parts; and
a managing apparatus configured to remotely control the managed apparatus including a database configured to store the identification information of the managed apparatus and a part identification information in a correspondence manner,
the managed apparatus executes a procedure including transmitting identification information and part identification information of the managed apparatus, and
the managing apparatus executes a procedure, the procedure including:
specifying a combination of parts of the managed apparatus based on a correspondence between the identification information received from the managed apparatus and the identification information stored in the database;
writing the identification information received from the managed apparatus in the database according to the specified combination of parts of the managed apparatus; and
transmitting a signal restricting an operation to the specified managed apparatus when determining a difference in the correspondence between the identification information received and the identification information stored and the determining finds no indication of a validity of the difference, and wherein
the writing updates the database based on the identification information received from the managed apparatus and the identification information stored in the database.

2. The control assistance system according to claim 1, wherein when the specifying specifies a first combination of parts of the managed apparatus, the writing writes the identification information received from the specified managed apparatus in the database, and when the specifying specifies a second combination of parts of the managed apparatus, the transmitting transmits a signal restricting an operation to the specified managed apparatus.

3. The control assistance system according to claim 1, wherein the transmitting transmits a signal prohibiting startup of the specified managed apparatus.

4. The control assistance system according to claim 2,
wherein the parts have a storage device storing data, and
when the specifying specifies a third combination of parts of the managed apparatus, the transmitting transmits a signal prohibiting data erasure in the storage device to the specified managed apparatus.

5. The control assistance system according to claim 1,
wherein the procedure executed by the managed apparatus includes detecting an exchange of part, and
when the exchange of part is detected by the detecting, the transmitting transmits identification information and identification information of the exchanged part.

6. The control assistance system according to claim 5, wherein the detecting operates at a time of startup of the managed apparatus.

7. The control assistance system according to claim 5, wherein the detecting operates in response to reception of a signal erasing the data in the storage device.

8. The control assistance system according to claim 1, wherein the procedure executed by the managing apparatus includes:
externally receiving a remote control request for the managed apparatus; and
generating a remote control signal in response to the received request, and
the transmitting transmits the generated signal.

9. The control assistance system according to claim 5, wherein when an exchange of part is not detected, the managed apparatus advances an operation without transmitting the identification information.

10. An information processing apparatus of controlling an external apparatus having a plurality of parts, the information processing apparatus comprising:
a storage unit; and
a processor that executes a procedure, the procedure including:
specifying a combination of parts of the external apparatus based on the correspondence between identification information received from the external apparatus and identification information stored in the storage unit;
writing the identification information received from the external apparatus in the storage unit depending on the specified combination of parts of the external apparatus; and
transmitting a signal restricting an operation to the specified external apparatus when determining a difference in the correspondence between the identification information received and the identification information stored and the determining finds no indication of a validity of the difference, and
wherein the writing updates a database based on the identification information received from the external apparatus and the identification information stored in the database.

11. A non-transitory computer-readable recording medium recording therein a computer program for causing a computer to control an external apparatus having a plurality of parts, the computer program causing the computer to perform the operations of:
storing identification information of the external apparatus and identification information of the parts in a correspondence manner in the database;

specifying a combination of parts of the external apparatus based on the correspondence between the identification information received from the external apparatus and the stored identification information;

writing the identification information received from the external apparatus depending on the specified combination of parts of the external apparatus; and transmitting a signal controlling an operation to the specified external apparatus when determining a difference in the correspondence between the identification information received and the identification information stored and the determining finds no indication of a validity of the difference, and wherein the writing updates a database based on the identification information received from the external apparatus and the identification information stored in the database.

12. A method of controlling an operation of an apparatus having a plurality of parts, the method comprising:

specifying a combination for the plurality of parts based on a correspondence between identification information received from the apparatus and stored identification information of the plurality of parts;

writing identification information received from an external apparatus according to the combination of the parts specified; and restricting an operation of the apparatus when information of the combination of parts received from the apparatus does not match the identification information in accordance with the writing, where the restricting is implemented when determining a difference in the correspondence between the identification information received and the identification information stored and the determining finds no indication of a validity of the difference.

* * * * *